United States Patent
Zhang et al.

(10) Patent No.: US 8,339,741 B2
(45) Date of Patent: Dec. 25, 2012

(54) WRITE POLE TRAILING EDGE PARTIAL SIDE SHIELD

(75) Inventors: Yifan Zhang, Eden Prairie, MN (US); Mark T. Kief, Lakeville, MN (US); Dion Song, Eden Prairie, MN (US); Lijuan Zou, Eden Prairie, MN (US); Charles E. Hawkinson, Crystal, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 741 days.

(21) Appl. No.: 12/489,287

(22) Filed: Jun. 22, 2009

(65) Prior Publication Data

US 2010/0321835 A1     Dec. 23, 2010

(51) Int. Cl.
*G11B 5/33*     (2006.01)
(52) U.S. Cl. .................................... 360/125.74
(58) Field of Classification Search .......... None
See application file for complete search history.

(56) References Cited

U.S. PATENT DOCUMENTS

| | | | |
|---|---|---|---|
| 5,075,956 A | 12/1991 | Das | |
| 6,477,002 B1 | 11/2002 | Mizoh | |
| 7,715,147 B2 | 5/2010 | Feldbaum et al. | |
| 7,894,159 B2 | 2/2011 | Lengsfield, III et al. | |
| 2003/0016470 A1 | 1/2003 | Minor et al. | |
| 2004/0066579 A1 | 4/2004 | Yamanaka | |
| 2005/0141137 A1 | 6/2005 | Okada et al. | |
| 2005/0237665 A1 | 10/2005 | Guan et al. | |
| 2006/0000794 A1 | 1/2006 | Le | |
| 2006/0044682 A1 | 3/2006 | Le et al. | |
| 2007/0177301 A1* | 8/2007 | Han et al. | 360/126 |
| 2007/0211377 A1 | 9/2007 | Sasaki et al. | |
| 2007/0217069 A1 | 9/2007 | Okada et al. | |
| 2007/0268626 A1 | 11/2007 | Taguchi et al. | |
| 2008/0225426 A1 | 9/2008 | Roy et al. | |
| 2008/0278862 A1* | 11/2008 | Kameda et al. | 360/319 |
| 2009/0122449 A1* | 5/2009 | Kim et al. | 360/319 |
| 2009/0154013 A1* | 6/2009 | Sugiyama et al. | 360/125.3 |
| 2009/0168257 A1 | 7/2009 | Hsiao et al. | |
| 2010/0165517 A1* | 7/2010 | Araki et al. | 360/319 |

* cited by examiner

*Primary Examiner* — Mark Blouin
(74) *Attorney, Agent, or Firm* — Hall Estill Attorneys at Law

(57) ABSTRACT

A magnetic writer has at least a write pole with a first partial side shield and a second partial side shield. The write pole has a leading edge and a trailing edge along an air bearing surface (ABS) and a first side and a second side along an axis orthogonal to the ABS. The first partial side shield is separated from the first side of the write pole and extends from adjacent the write pole from the trailing edge to a location intermediate that trailing edge and the leading edge.

20 Claims, 7 Drawing Sheets

WRITE POLE TRAILING EDGE PARTIAL SIDE SHIELD

SUMMARY

A magnetic writer has at least a write pole with a first partial side shield and a second partial side shield. The write pole has a leading edge and a trailing edge along an air bearing surface (ABS) and a first side and a second side along an axis orthogonal to the ABS. The first partial side shield is separated from the first side of the write pole and extends from adjacent the write pole from the trailing edge to a location intermediate that trailing edge and the leading edge.

DETAILED DESCRIPTION

Figure 1:
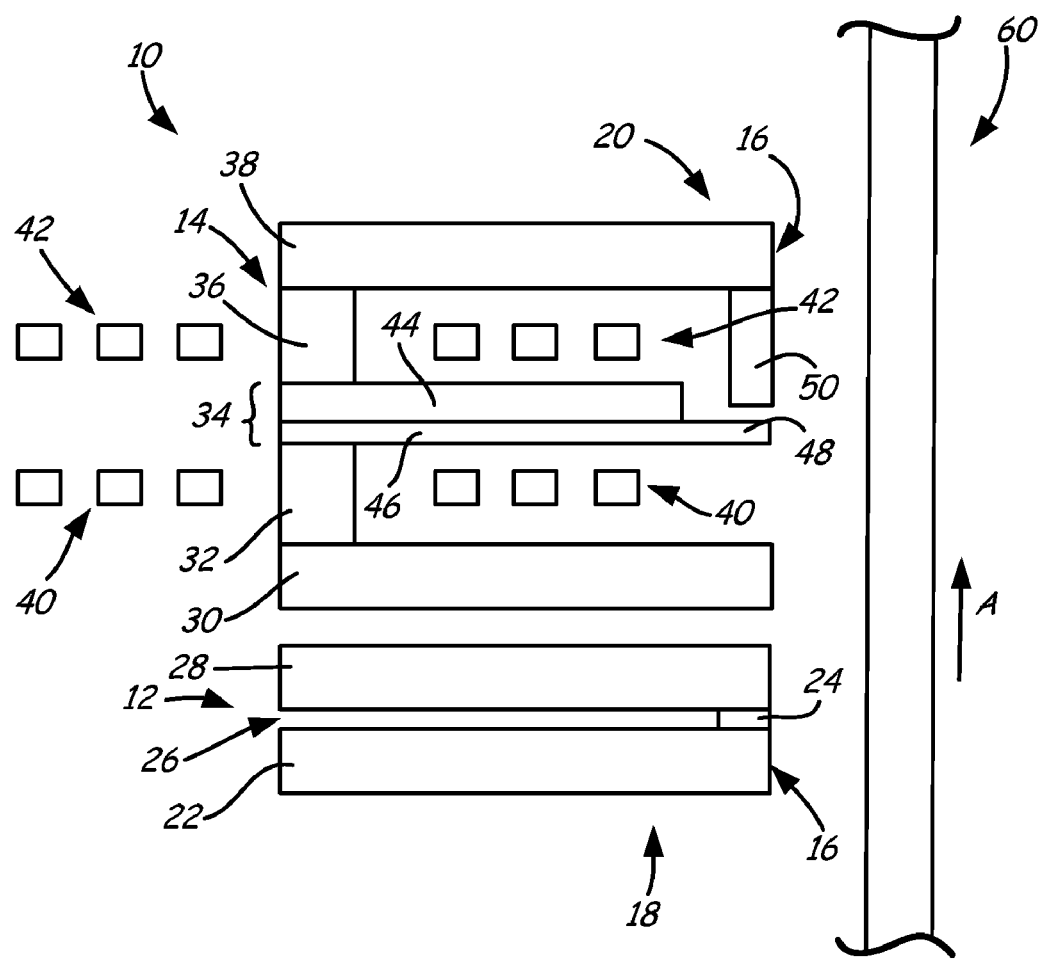
FIG. 1 is a cross-sectional view of a transducing head taken substantially normal to a magnetic medium.

FIG. 1 is a cross-sectional view of an example transducing head 10, which includes reader 12 and writer 14 that define medium confronting surface 16. Reader 12 and writer 14 have medium confronting surface 16, leading edge 18 and trailing edge 20. Reader 12 includes bottom shield structure 22, read element 24, read gap 26 and top shield structure 28. Writer 14 includes at least a first return pole 30, first magnetic stud 32, main pole 34, second magnetic stud 36, second return pole 38, first conductive coil 40 and second conductive coil 42. Main pole 34 has yoke 44, main pole body 46 and main pole tip 48. Front shield 50 shields main pole 34.

Reader 12 and writer 14 can be multi-layered devices having featured formed by layered materials. In one example, as illustrated in FIG. 1, writer 14 is stacked on reader 12 in a piggyback configuration in which layers are not shared between the two elements. In other examples, reader 12 and writer 14 can be arranged in a merged-head configuration (in which layers are shared between the two elements) and/or reader 12 may be formed on writer 14. Other configurations of reader 12 and writer 14 are also possible.

On reader 12, read gap 26 is defined on medium confronting surface 16 between terminating ends of bottom shield 22 and top shield 28. Read element 24 is positioned in read gap 26 adjacent medium confronting surface 16. Read gap 26 insulates read element 24 from bottom shield 22 and top shield 28. Read element 24 may be any variety of different types of read elements, such as a magnetoresistive (MR) element, a tunneling magnetoresistive (TMR) read element or a giant magnetoresistive (GMR) read element.

Transducing head 10 confronts magnetic medium 60 at medium confronting surface 16, such as an air bearing surface (ABS). Reader 12 and writer 14 are carried over the surface of magnetic medium 60, which is moved relative to transducing head 10 as indicated by arrow A such that main pole 34 leads second return pole 38 and trails first return pole 30. Writer 14 has leading edge 18 and trailing edge 20 defined by the movement of magnetic medium 60. Main pole 34 is used to physically write data to magnetic medium 60. In order to write data to magnetic medium 60, current is caused to flow through second conductive coil 42. The magnetomotive force in the coils causes magnetic flux to travel from main pole tip 48 through magnetic medium 60 to second return pole 38 and second magnetic stud 36 to provide a closed magnetic flux path. A similar process occurs for first conductive coil 40 and first return pole 30. The direction of the write field at the medium confronting surface of main pole tip 48, which is related to the state of the data written to magnetic medium 60, is controllable based on the direction that the current flows through second conductive coil 42.

Reader 12 reads data from magnetic medium 60. In operation, magnetic flux from a surface of magnetic medium 60 causes rotation of a magnetization vector of read element 24, which in turn causes a change in electrical resistivity of read element 24. The change in resistivity of read element 24 can be detected by passing a current through read element 24 and measuring a voltage across read element 24. Shields 22 and 28, which may be made of a soft ferromagnetic material, guide stray magnetic flux from medium layer 66 away from read element 24 outside the area of medium layer 66 directly below read element 24.

In writer 14, first return pole 30, second return pole 38, first magnetic stud 32, and second magnetic stud 36 can comprise soft magnetic materials, such as NiFe. Conductive coils 40 and 42 can comprise a material with low electrical resistance, such as Cu. Main pole body 46 can comprise a high moment soft magnetic material, such as CoFe. First magnetic stud 32 magnetically couples main pole 34 to first return pole 30, and second magnetic stud 36 magnetically couples main pole 34 to second return pole 38. First conductive coil 40 surrounds first magnetic stud 32 and passes through the gap between first return pole 30 and main pole 34. Similarly, second conductive coil 42 surrounds second magnetic stud 36 and passes through the gap between main pole 34 and second return pole 38.

Magnetic medium 60 is shown merely for purposes of illustration, and may be any type of medium that can be used in conjunction with transducing head 10, such as composite media, continuous/granular coupled (CGC) media, discrete track media, and bit-patterned media.

Reader 12 and writer 14 are shown merely for purposes of illustrating a construction that may be used in a transducing head 10 and variations on the designs may be made. For example, a single trailing return pole may be provided on writer 14 instead of the shown dual return pole writer configuration.

Figure 2:
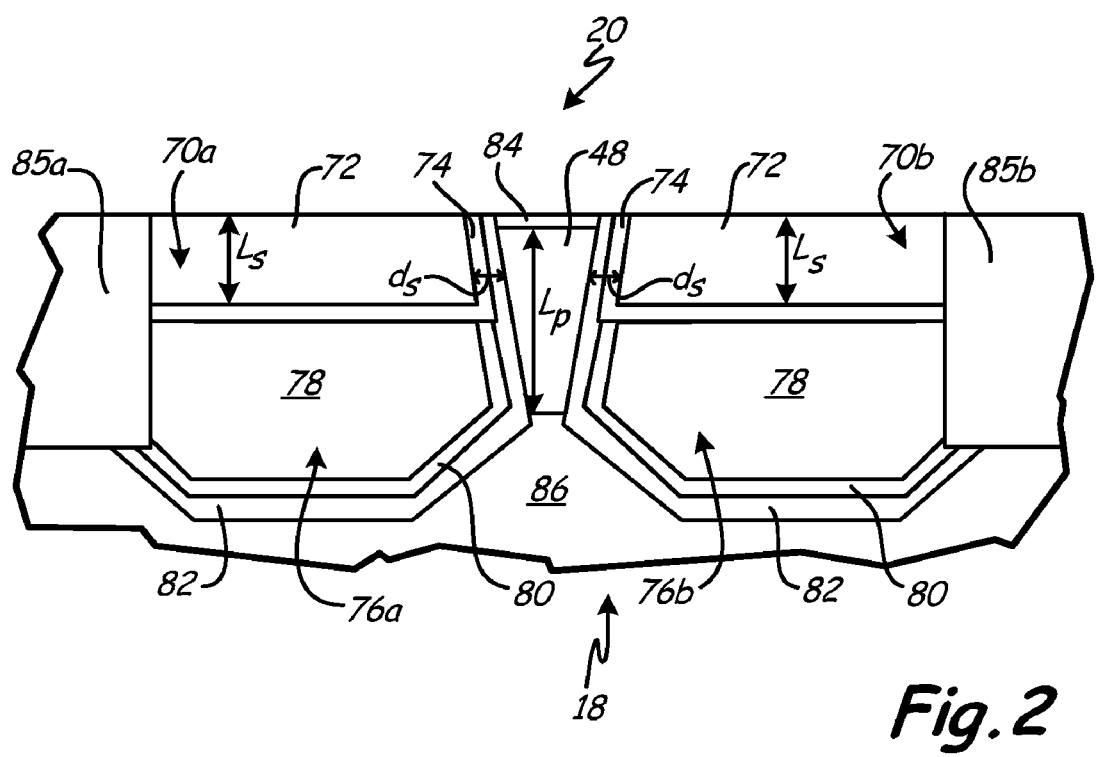
FIG. 2 is an end view of a main pole having partial side shields as viewed from the magnetic medium.

FIG. 2 is an end view of the example main pole or write pole 48 shown in FIG. 1 as seen from magnetic medium 60. Main pole 48 is surrounded by first and second partial side shields 70a and 70b, respectively, (referred to generally as side shields 70 and including magnetic material 72 and insulating layer 74), first and second spacers 76a and 76b, respectively, (referred to generally as spacers 76 and including non-magnetic material 78 and seed layer 80), insulating layer 82, write gap 84 and first and second alumina layers 85a and 85b, respectively, (referred to generally as alumina layer 85), and is formed on substrate 86. Partial side shields 70 extend along the sides of main pole 48 from trailing edge 20 to a location intermediate trailing edge 20 and leading edge 18. Partial side shields 70 are formed of magnetic material 72, so that during use partial side shields 70 reduce the erase band of main pole 48. In one example, magnetic material 72 of partial side shields 70 is a nickel, cobalt or iron alloy or a combination thereof.

Partial side shields 70 are self-aligned in the cross-track direction, and are equally positioned on either side of main pole 48. Partial side shields 70 shield only a portion of main pole 48; partial side shields 70 do not extend the entire length of main pole 48. Main pole 48 has top pole length (TPL) $L_p$, and side shields 70 have side shield length $L_s$. First and second partial side shields 70a and 70b are spaced apart from main pole 48 by an equal distance labeled $d_s$. Distance $d_s$ between side shields 70 and main pole 48 can also be referred to as the side shield gap. As illustrated, side shield length $L_s$ is less than TPL $L_p$ so that side shields 70 do not extend the entire length of main pole 48. In a specific example, side shield length $L_s$ is about less than or equal to half of TPL $L_p$. In another example, side shield length $L_s$ is between about 100 nm and 150 nm and TPL $L_p$ is about 200 nm.

Partial side shields 70 can be at least partially enclosed by insulating layers or side shield gap material 74. Insulating layers 74 separate partial side shields 70 from main pole 48 and form part of the side shield gaps. Insulating layers 74 are formed from non-magnetic materials, such as but not limited to alumina, chromium and combinations thereof.

Spacers 76 extend along either side of main pole 48, and are located under or beneath partial side shields 70. Spacers 76 provide a step for partial side shields 70 to be built upon, and prevent partial side shields 70 from extending the entire length of main pole 48. Together, spacers 76 and partial side shields 70 extend the entire length of main pole 48. The length of partial side shields 70 can be controlled by adjusting the depth or thickness of spacers 76. Spacers 76 are formed from non-magnetic material 78. Seed layer 80 may partially surround non-magnetic material 78 of spacers 76. Seed layer 80 is formed of a conductive, non-magnetic material. Seed layer 80 provides a conductive layer on to which spacers 76 are plated. Spacers 76 do not adversely affect the magnetic signal from main pole 48 because spacers 76 are formed from non-magnetic material. Because magnetic material is present in partial side shields 70 and not in spacers 76, and because partial side shields 70 merely extend a portion of the length of main pole 48, main pole 48 has an improved pole field compared to a main pole having side shields which extend the entire length of the main pole.

Partial side shields 70 are located at trailing edge 20 of main pole 48. Partial side shields 70 at trailing edge 20 improve the tracks per inch (TPI) of the transducing head at low skew. Partial side shields 70 are formed from a magnetic material such as a nickel, cobalt or iron alloy having a high magnetic moment. The magnetic material of partial side shields 70 draw flux from main pole 48, thus reducing the pole field so that there is less magnetic signal to write to the magnetic medium. By only shielding a portion of main pole 48 with partial side shields 70, the pole field is improved as compared to a main pole having shields that extend the entire top pole length (TPL). Modeling has suggested that a main pole having partial side shields 70, which are located at trailing edge 20 and which extend about 50% of TPL, will improve the pole field by about 5-7% when compared to a main pole having side shields that extend the entire length of the TPL under the same current.

Relative to a full side shield, the partial side shield design gains write field at the expense of exposing the leading edge. At low skew conditions, partial side shields 70 increases TPI by reducing the erasure band of main pole 48. However, exposing leading edge at high skew conditions can lead to ATI (adjacent track interference). Therefore the concept of partial side shields is more attractive to recording systems in which skew and ATI are less of a concern.

Insulating layers or side shield gap material 82 partially surround magnetic material 72 and non-magnetic material 78. Insulating layers 82 are formed from non-magnetic materials, such as but not limited to alumina, chromium and combinations thereof. Insulating layers 82 separate main pole 48 from partial side shields 70. Insulating layers 82 together with insulating layers 74 form the side shield gaps between main pole 48 and partial side shields 70. Alternatively, insulating layers 74 may not be present so that the side shield gaps are formed only by insulating layer 82.

Write gap 84 is located on top of main pole 48. Write gap 84 is adjacent to main pole 48 and is opposite substrate 86. Write gap 84 separates main pole 48 at trailing edge 20 from other features that may be present on a writer, such as a front shield (not shown). Write gap 84 is formed from a non-magnetic material such as alumina, chromium (Cr) and combinations thereof.

Alumina layers 85 are located adjacent to partial side shields 70 and spacers 76 and opposite from main pole 48. Alumina layers 85 are non-magnetic. Alumina layers 85 insulate the sides of partial side shields 70.

FIGS. 3-8 are cross-sectional views of an example wafer during fabrication of a write element and illustrate a method of making main pole 48 having partial side shields 70 and spacers 76. The steps include forming layered substrate or structure 88, removing selected portions of layered structure 88, depositing non-magnetic material 78 to form spacers 76, removing selected portions of non-magnetic material 78 and depositing magnetic material 72 to form partial side shields 70.

Figure 3:
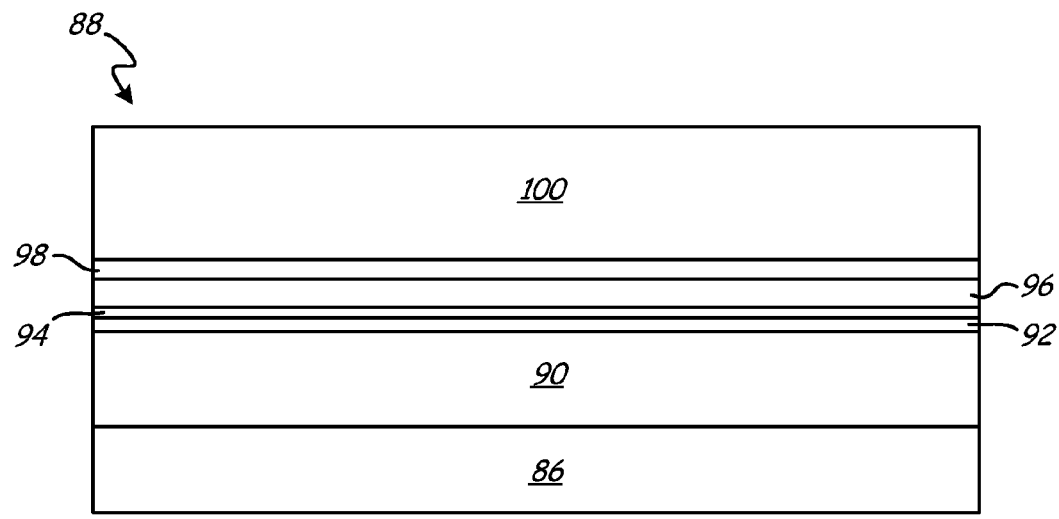
FIGS. 3-9 illustrate the process for forming the main pole having partial side shields as shown in FIG. 2.

First, as illustrated in FIG. 3, layers are deposited on substrate 86 to form layered structure 88. With substrate 86 as a base, write pole material 90 is deposited, then write gap material 92, first stop layer 94, sacrificial material 96, second stop layer 98 and finally hard mask material 100. Write pole material 90 is a high moment magnetic material. In one example, write pole material 90 has a magnetic moment of at least 2.0 tesla (T). In another example, write pole material 90 has a magnetic moment of about 2.4 T. In a further example, write pole material 90 includes at least one of CoFe, CoFeNi, CoFeRh, CoFeRu, CoFePt, CoFePd and NiFe.

Write gap material 92 is a non-magnetic material such as alumina, chromium (Cr) and combinations thereof. First and second stop layer 94 and 98, respectively, are inductively coupled plasma (ICP) etch stop layers such that first and second stop layers 94 and 98 are not removed by ICP etching. In one example, first and second stop layers 94 and 98 are formed from chromium. Sacrificial layer 96 must have a low argon etch rate as will be described later. In one example, sacrificial layer 96 contains alumina or amorphous carbon (a-carbon). Hard mask material 100 is used to pattern write pole material 90 to shape main pole 48. In one example, hard mask material 100 is alumina. It should be noted that a transducing head is formed in layers. Therefore, substrate 86 contains previously formed layers of a transducing head.

The thickness of write pole material 90 determines the length of main pole 48 at the medium facing surface. Similarly, the thickness of write gap material 92 determines the length of write gap 84 (the distance between main pole 48 and the feature formed on top of main pole 48). In one example, write pole material 90 is about 200 nm thick, write gap material 92 is about 30 nm thick, first stop layer 94 is between about 10 nm and about 15 nm thick, second stop layer 98 is about 30 nm thick and hark mask material 100 is about 1 um thick. The thickness of sacrificial layer 96 is based upon the desired length of partial side shields 70 and the mill rates of several materials as will be explained below. In one example, sacrificial layer 96 is between about 20 nm and about 30 nm thick.

After layered structure 88 has been formed, a photolithography process is used to pattern hard mask material 100. Photolithography uses light to transfer a pattern from a photomask to a light sensitive photoresist on the surface of hard mask material 100. With the photoresist in place, hard mask material 100 is etched using inductively coupled plasma (ICP) etching. ICP etching will remove the selected areas of hard mask material 100 that are not covered with the photoresist. ICP etching will not remove second stop layer 98; ICP etching will only remove hard mask material 100.

Figure 4:
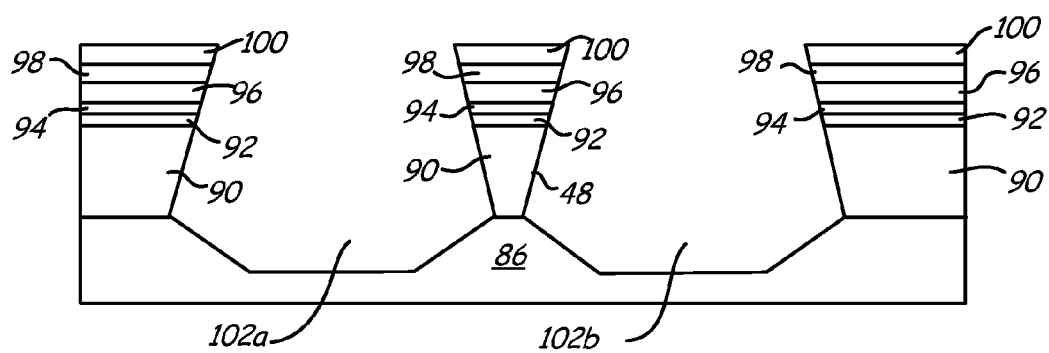

Following ICP etching of hard mask material 100, the exposed second stop layer 98 is removed using an ion milling technique. Based on the pattern formed in hard mask material 100, the ion milling will remove selected portions of second stop layer 98, sacrificial layer 96, first stop layer 94, write gap material 92, write pole material 90 and substrate 86. As illustrated in FIG. 4, the ion milling forms a trapezoidal-shaped main pole 48 and first and second recesses 102a and 102b, respectively, (referred to generally as recesses 102) on either side of main pole 48. During the ion milling process, the angle of incidence is varied to produce the trapezoidal-shape of main pole 48. The formation of main pole 48 and recesses 102 uses a single patterning step that eliminates the potential for pattern misalignment and creates recesses 102 immediately adjacent to main pole 48.

Figure 5:
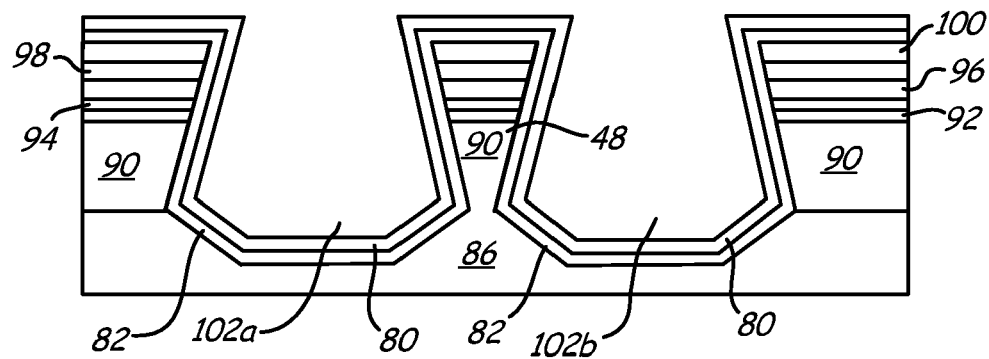

As shown in FIG. 5, after recesses 102 are formed, insulating layer 82 is deposited in recesses 102 and seed layers 80 are deposited on insulating layer 82. Insulating layer 82 separates main pole 48 from partial side shields 70, and insulating layer 82 forms at least part of the side shield gap. Insulating layer 82 must be formed of a non-magnetic, electrically insulating material. In one example, insulating layer 82 is formed of atomic layer deposited (ALD) alumina. Seed layer 80 provides a non-magnetic, conductive base on which to electrodeposit or plate. Seed layer 80 is a conductive material such as, but not limited to, gold, copper and ruthenium.

Figure 6:
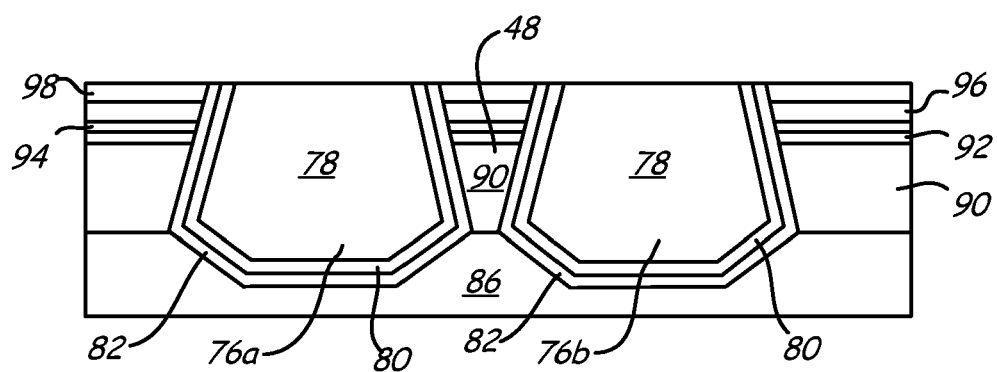

FIG. 6 illustrates the example write element after non-magnetic material 78 has been plated on seed layer 80 to form spacers 76, and the write element has been planarized down to second stop layer 98. Non-magnetic material 78 is chosen such that non-magnetic material 78 has a higher argon mill rate than sacrificial layer 96. In one example, non-magnetic material 78 is a soft metal such as, but not limited, to gold, copper and aluminum.

Plating of non-magnetic material 78 results in an uneven or mushroom shaped top surface. The write element is planarized to level the surface. In one example, write element can be planarized using chemical-mechanical planarization (CMP) until second stop layer 98 is reached. The polishing time of the CMP process is calculated such that the write element is polished down to second stop layer 98. Second stop layer 98 creates a level surface on the write element at a pre-determined distance from the top of main pole 48. The pre-determined distance may be adjusted by adjusting the thicknesses of second stop layer 98 and, additionally or alternatively, the thickness of at least one of the layers below second stop layer 98 (i.e. sacrificial layer 96, first stop layer 94).

Figure 7:
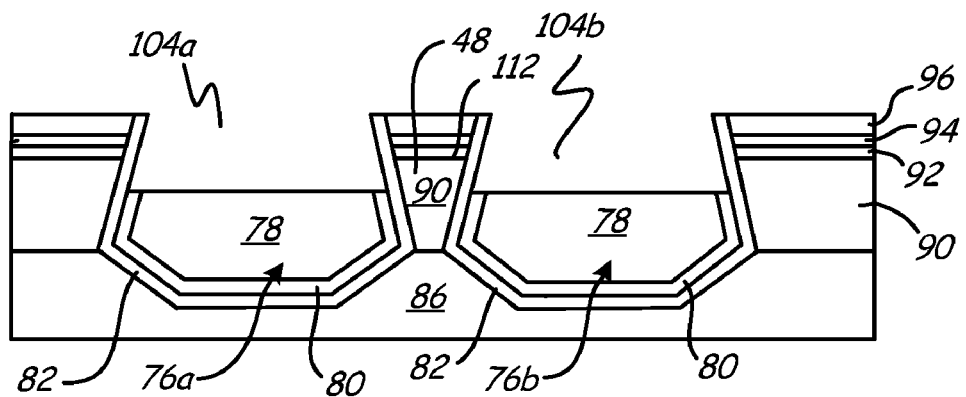

Next, as shown in FIG. 7, first and second cavities 104a and 104b, respectively, (referred to generally as cavities 104) are formed by selectively removing a portion of non-magnetic material 78 by ion milling, such as argon milling. The milling process removes second stop layer 98 and a significant portion of sacrificial layer 96 from above main pole 48. The milling process also removes a portion of insulating material 82 and non-magnetic material 78. Sacrificial layer 96 protects desired features of the write element while the milled portions of spacers 76 form steps upon which partial side shields 70 will be built. Sacrificial layer 96 allows cavities 104 to be formed without an additional photoresist patterning. Instead, the write element is milled for a specified time so that a selected amount of material is removed. First and second cavities 104a and 104b are not as deep as non-manetic material 78. By knowing the milling rates of second stop layer 98, non-magnetic material 78 and sacrificial layer 96, the depth of cavities 104 can be controlled by adjusting the mill time and the thickness of sacrificial layer 96. Sacrificial layer 96 should be thick enough so that the entire layer is not removed during the milling process. As discussed above, non-magnetic material 78 has a higher mill rate than sacrificial layer 96 so that for a set time period, more non-magnetic material 78 is removed than sacrificial layer 96. This allows the thickness of sacrificial layer 96 to be less than the depth of cavities 104. In one example, non-magnetic material 78 is gold and sacrificial layer 96 is amorphous carbon (a-carbon) so that there is an argon mill ratio of 12 nm of gold removed for every 1 nm of a-carbon. This mill rate difference allows a larger amount of gold to be removed for every 1 nm of a-carbon, thus forming cavities 104.

The mill rate difference determines the thickness of sacrificial layer 96 deposited on substrate 86. In one example, the ratio of the thickness of sacrificial layer 96 to the desired depth of cavities 104 (and thus the length of partial side shields 70) is 1:5. In this case, sacrificial layer 96 having a thickness between 20 nm and 30 nm will produce cavities 104 having a depth between 100 nm and 150 nm, respectively. The described milling process does not require additional patterning of the substrate to form cavities 104, eliminating the possibility of misalignment of partial side shields 70. The resulting partial side shields 70, which are deposited in cavities 104, are self-aligned in the cross track direction.

Figure 8:
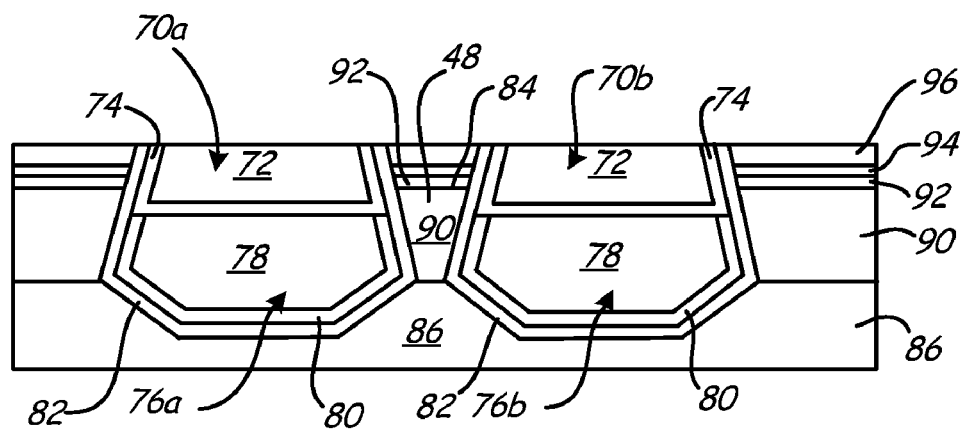

Next, as illustrated in FIG. 8, insulating layers 74 and magnetic material 72 can be deposited in cavities 104 to form partial side shields 70. Insulating layers 74 are formed from a non-magnetic, electrically insulating material. In one example, insulating layers 74 are formed from atomic layer deposited (ALD) alumina. Magnetic material 72 is a magnetic material such as but not limited to nickel, cobalt and iron alloys and combinations thereof. In one example, magnetic material 72 is sputter deposited. In another example, magnetic material 72 is plated such as by electrodeposition. The length $L_s$ of partial side shields 70 is determined by the depth of cavities 104. The depth of cavities 104 is determined by the milling of non-magnetic material 78 and can be adjusted to different percentages of the length of main pole 48 to meet design requirements. Although insulating layers 74 have been described as part of partial side shields 70, alternatively, insulating layers 74 may not be deposited such that only magnetic material 72 forms partial side shields 70.

After partial side shields 70 are formed, the write element can be backfilled and planarized down to sacrificial layer 96. Planarization levels deposited insulating layer 74 and magnetic material 72 at the surface.

Figure 9:
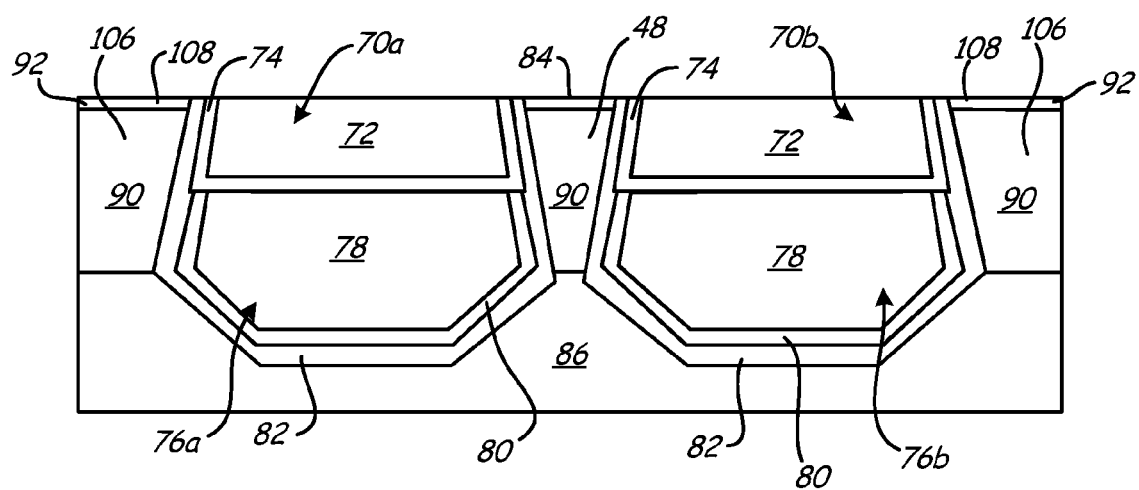

Next, as shown in FIG. 9, sacrificial layer 96 and first stop layer 94 can be removed, such as by ICP etch, to leave a clear, well defined write gap 84 on main pole 48. Finally, before use, residual write pole material 106 and residual write gap material 108 on either side of partial side shields 70 is removed. In one example, residual write pole material 106 and residual write gap material 108 is removed by ion milling. Alumina is deposited in the voids created by the removal of residual write pole material 106 and residual write gap material 108. The deposited alumina creates alumina layers 85 as illustrated in FIG. 2. The surface of the write element may be planarized to level the deposited alumina.

The write element can be subjected to downstream processing, such as the formation of a front shield on top of write pole 48, at any time after sacrificial layer 96 and first stop layer 94 have been removed. Alternatively, first stop layer 94 may be left on write pole 48 as a control layer during further downstream processing.

Figure 10:
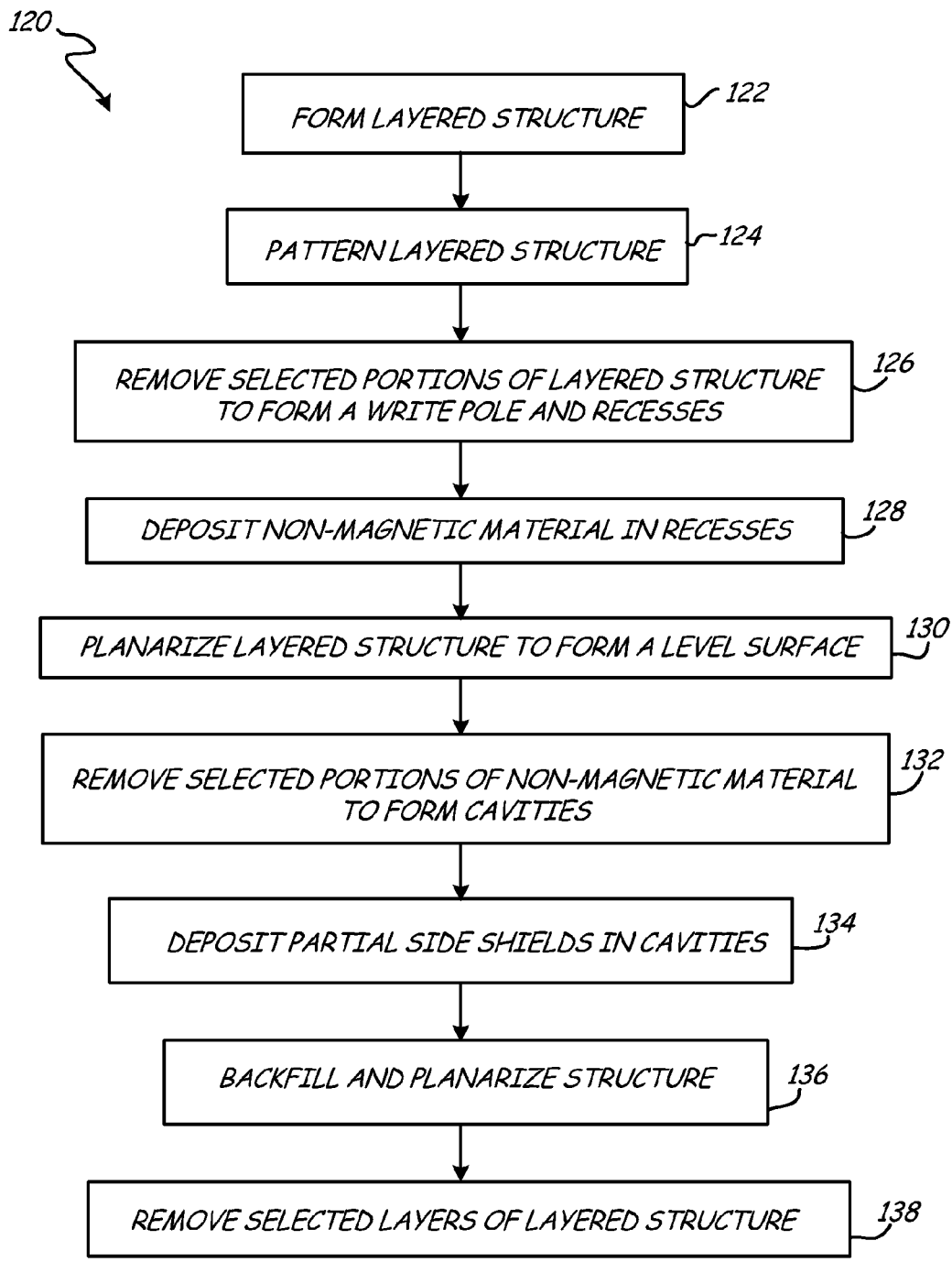
FIG. 10 provides a flowchart of an example side shield fabrication routine.

In summary, as shown in FIG. 10, method 120 for producing partial side shields 70 on either side of write pole 48 includes forming a layered structure (step 122), patterning the layered structure (step 124), removing selected portions of the layered structure to form a write pole and recesses (step 126), depositing non-magnetic material in the recesses (step 128), planarizing the layered structure to form a level surface (step 130), removing selected portions of the non-magentic material to form cavities (step 132), depositing partial side shields in the cavities (step 134), backfilling and planarizing the structure (step 136), and removing selected layers of the layered structure (step 138).

In step 122, a layered structure is formed. As described above, layered structure 88 can be formed by depositing write pole material 90 on substrate 86, followed by write gap material 92, first stop layer 94, sacrificial material 96, second stop layer 98 and hard mask material 100. Next, in step 124, the layered structure is patterned. For example, layered structure 88 can be patterned by using a photolithography process to transfer a pattern hard mask material 100, followed by an etching technique, such as IPC etching, to remove selected areas of hard mask material 100 not covered with the photoresist.

After the layered structure is patterned, selected portions of the layered structure are removed in step 126 to form a main or write pole and recesses. As described above, based on the pattern of hard mask material 100, ion milling can be used to remove selected portions of write pole material 90, write gap material 92, first stop layer 94, sacrificial material 96 and second stop layer 98 to form main pole 48, which has recesses 102 on either side.

Next, in step 128, non-magnetic material is deposited in the recesses. Deposition of the non-magnetic material can include depositing an insulating layer, such as insulating layer 82, and a seed layer, such as seed layer 80, in the recesses, followed by plating of a non-magnetic material, such as non-magnetic material 78. After depositing the non-magnetic material in the recesses, the write element is planarized to create a level or flat surface in step 130.

In step 132, selected portions of the non-magnetic material are removed to form cavities in the recesses. For example, as described above, non-magnetic material 78 can be removed by ion milling, and the length of the milling process and the milling rates of the materials determine the length of partial side shields 70.

In step 134, partial side shields are deposited in the cavities. Deposition of the partial side shields can include depositing an insulating layer, such as insulating layer 74, and magnetic material, such as magnetic material 72, in the cavities, such as cavities 104. Alternatively, deposition of the partial side shields can include only depositing magnetic material so that the partial side shields do not include the insulating layer. The write pole has a leading edge and a trailing edge. The partial side shields are deposited between a location intermediate the trailing edge and the leading edge of the write pole and the trailing edge of the write pole so that the partial side shields do not shield the leading edge of the write pole.

Finally, the write element is backfilled and planarized in step 136, and selected layers of layered structure 88 are removed in step 38. For example, sacrificial layer 96 and first stop layer 94 can be removed by IPC etch. In another example, residual write pole material 106 and residual write gap material 108 can be removed by ion etching.

The method described above provides a controllable step height upon which self-aligning (in the cross-track direction) partial side shields 70 are built. Partial side shields 70 are built upon features formed during the formation of main pole 48 such that a second photoresist patterning to define partial side shields 70 is not used. Sacrificial layer 96 protects desired features on the write element, and allows cavities 104 to be milled without an additional patterning process, thus eliminating the potential for misalignment of cavities 104 and partial side shields 70. The resulting partial side shields 70 are uniform in shape and size and are symmetric about main pole 48.

Additionally, the method provides control of length $L_s$ of partial side shields 70. Length $L_s$ of partial side shields 70 with respect to length $L_p$ of main pole 48 may be adjusted according to different design criteria by adjusting the milling time, the mill rate difference between non-magnetic material 78 and sacrificial layer 96 and the thickness of the layers deposited on substrate 86, such as sacrificial layer 96. In one example, partial side shields 70 extend along side of main pole 48 from trailing edge 20 to an intermediate point located between trailing edge 20 and leading edge 18. In another example, partial side shields 70 extend from trailing edge 20 of main pole 48 and have length $L_s$ about equal to or less than about half of length $L_p$ of main pole 48. By providing partial side shields 70 at trailing edge 20 of main pole 48 and not covering main pole 48 at leading edge 18, the pole field is improved, as compared to side shields that extend the entire length of the main pole under the same current. The resulting main pole 48 has an improved tracks per inch (TPI) at low skew.

The method also provides a well controlled space between partial side shields 70 and main pole 48 (illustrated in FIG. 2 as distance $d_s$ and also known as a side shield gap). Formation of cavities 104 and recesses 102 create uniform voids on either side of main pole 48. These uniform voids are then filled with about uniform layers of insulating material 74, 82 through atomic layer deposition (ALD), resulting in well controlled side shield gaps. The thickness of side shield gaps can be controlled by controlling the amount of insulating material 74, 82 deposited.

Further, the method provides a self-aligned writer gap 84 on top of main pole 48. By layering write gap material 92 on write pole material 90 and sacrificial layer 96 on write gap material 92, writer gap 84 may be defined at the same time as main pole 48. Additionally, writer gap 84 is present during the formation of partial side shields 70 so that partial side shields 70 may be formed immediately adjacent to writer gap 84 (i.e. there is no disconnect between partial side shields 70 and write gap 84).

Although the present invention has been described with reference to preferred embodiments, workers skilled in the art will recognize that changes may be made in form and detail without departing from the spirit and scope of the invention.

The invention claimed is:

1. A magnetic writer comprising:
    a write pole having a leading and trailing edge along an air bearing surface (ABS) and having first and second sides along an axis orthogonal to the ABS, the leading edge having a first width that is less than a second width of the trailing edge; and
    a first partial side shield located on the first side of the write pole proximal the trailing edge, the first partial side shield separated from the leading edge of the write pole by a non-magnetic material and extending from adjacent the trailing edge to a location intermediate the trailing edge and leading edge.

2. The magnetic writer of claim 1, wherein the non-magnetic material is separated from the first partial side shield by a first insulating layer.

3. The magnetic writer of claim 1, wherein the first partial side shield and non-magnetic material are each separated from the write pole by a second insulating layer.

4. A method of forming a partial side shield on a magnetic writer, the method comprising:
  forming a layered substrate, including a layer of write pole material;
  removing a portion of the layered substrate to form a write pole and a recess formed adjacent to the write pole;
  depositing a non-magnetic material in the recess to align the recess with the write pole material;
  removing a portion of the non-magnetic material to form a cavity; and
  depositing a magnetic shield material in the cavity, wherein the cavity is not as deep as the non-magnetic material so that the magnetic material forms a partial side shield for the write pole.

5. The method of claim 4, wherein forming a layered substrate comprises:
  depositing a high moment magnetic material on a substrate to form the write pole material;
  depositing alternating layers of sacrificial material and stop material on top of the high moment magnetic material; and
  depositing a mask over the alternating layers of sacrificial material and stop material, wherein the non-magnetic material has a higher mill rate than the sacrificial material.

6. The method of claim 5, wherein the step of depositing alternating layers of sacrificial material and stop material comprises depositing sacrificial material selected from the group consisting of alumina and amorphous carbon.

7. The method of claim 5, wherein the step of depositing non-magnetic material in the recess comprises depositing non-magnetic material selected from the group consisting of Au, Cu and Al and alloys thereof.

8. The method of claim 5, and further comprising removing a portion of the sacrificial material at a same time as the portion of the non-magnetic material is removed, wherein the non-magnetic material has a higher rate of removal than the sacrificial material.

9. The method of claim 5, and further comprising depositing a write gap layer between the high moment magnetic material and the alternating layers of sacrificial material and stop material.

10. The method of claim 4, wherein the step of depositing a magnetic material in the cavity comprises depositing the magnetic material in the cavity to form a partial side shield extending between a trailing edge of the write pole and a location intermediate a leading edge of the write pole and the trailing edge of the write pole so that the partial side shield does not shield the leading edge of the write pole.

11. The method of claim 4, and further comprising depositing a side shield gap material in the recess prior to depositing the non-magnetic material in the recess.

12. The method of claim 11, wherein the step of depositing a side shield gap material comprises depositing alumina.

13. A method of forming a trailing edge, partial side shield for a magnetic writer, the method comprising:
  depositing a high moment magnetic material on a substrate;
  depositing alternating layers of sacrificial material and stop material on the high moment magnetic material;
  removing a portion of the high magentic material and the alternating layers of sacrificial material and stop material to form a write pole and a recess formed on a side of the write pole;
  depositing a non-magnetic material in the recess to align the recess with the write pole material;
  removing a portion of the non-magnetic material to form a cavity; and
  depositing a magnetic shield material in the cavity to form a partial side shield, the write pole having leading and trailing edges along an air bearing surface (ABS), the partial side shield extending from the trailing edge of the write pole to an intermediate location approximately half way between the leading and trailing edges of the write pole.

14. The method of claim 13, wherein removing a portion of the non-magnetic material comprises argon milling.

15. The method of claim 13, wherein the step of depositing a non-magnetic material comprises depositing non-magnetic material selected from the group consisting of Au, Cu and Al and alloys thereof.

16. The method of claim 13, wherein the step of depositing alternating layers of sacrificial material and stop material comprises depositing sacrificial material selected from the group consisting of a-carbon and alumina.

17. The method of claim 13, and further comprising depositing an insulating layer in the cavity prior to depositing the magnetic material.

18. The magnetic writer of claim 1, wherein a second partial side shield is positioned adjacent the second side of the write pole.

19. The magnetic writer of claim 1, wherein the first partial side shield continuously extends from the trailing shield to no farther than approximately half-way between the leading and trailing edges of the write pole.

20. The magnetic writer of claim 1, wherein the first partial side shield is aligned with the write pole along a cross-talk plane orthogonal to the ABS.

* * * * *